(12) United States Patent
Larsson et al.

(10) Patent No.: US 9,503,239 B2
(45) Date of Patent: Nov. 22, 2016

(54) RADIO NETWORK NODE, USER EQUIPMENT AND METHODS THEREIN

(75) Inventors: Daniel Larsson, Solna (SE); Robert Baldemair, Solna (SE); Jung-Fu Cheng, Fremont, CA (US); Mattias Frenne, Uppsala (SE); Dirk Gerstenberger, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 895 days.

(21) Appl. No.: 13/207,790

(22) Filed: Aug. 11, 2011

(65) Prior Publication Data

US 2013/0039188 A1    Feb. 14, 2013

(51) Int. Cl.
*H04W 4/00* (2009.01)
*H04L 5/00* (2006.01)
*H04L 1/00* (2006.01)

(52) U.S. Cl.
CPC ........... *H04L 5/0053* (2013.01); *H04L 1/0039* (2013.01)

(58) Field of Classification Search
CPC ............. H04W 72/04; H04W 72/042; H04W 72/044; H04W 72/0446; H04W 72/0453; H04W 72/048; H04L 5/0053
USPC ................. 370/310–350, 432, 473, 474, 475
See application file for complete search history.

(56) References Cited

U.S. PATENT DOCUMENTS

2003/0189918 A1* 10/2003 Das et al. ................... 370/349
2008/0205349 A1*  8/2008 Kim et al. .................. 370/335
2012/0106465 A1*  5/2012 Haghighat et al. ......... 370/329
2013/0003663 A1*  1/2013 Blankenship et al. ...... 370/329
2014/0003349 A1*  1/2014 Kang et al. ................. 370/328
2014/0098785 A1    4/2014 Frenne et al.

FOREIGN PATENT DOCUMENTS

WO    2008157692 A2    12/2008
WO    2010049754 A1     5/2010
WO    2011044755 A1     4/2011

OTHER PUBLICATIONS

U.S. Appl. No. 61/475,201.*

(Continued)

*Primary Examiner* — Ricky Ngo
*Assistant Examiner* — Wei-Po Kao

(57) ABSTRACT

Embodiments herein relate to a method in a user equipment for handling control information in a radio communications network. The user equipment is served in a cell controlled by a radio network node and is of a second type of user equipments. The user equipment monitors a search space for control information of a physical data control channel, PDCCH, which search space is associated with the second type of user equipments. The PDCCH comprises at least one control channel element that comprises resource elements at least partly comprised in a second region of resource elements. The resource elements of the second region are only allowed to be scheduled for control information to user equipments of the second type. The at least one CCE is defined in relation to a CCE of a first region of resource elements, which resource elements of the first region are allowed to be scheduled for control information to user equipments of a first type. The user equipment detects control information within the monitored search space, and uses the detected control information for communicating with the radio network node.

40 Claims, 14 Drawing Sheets

(56) References Cited

OTHER PUBLICATIONS

NTT DOCOMO. DL Control Channel Enhancement for DL MIMO in Rel-11, 3GPP Draft; R1-111636, DL Control Channel, Sophia-Antipolis Cedex France. May 3, 2011.
NTT DOCOMO. Further Investigation on UE—Specific Search Space Design for Carrier Aggregation. 3GPP Draft; R1-104923, SS Evaluation. Sophia-Antipolis Cedex France. Aug. 10, 2010.
CATT. PDCCH Search Space Design in LTE-A. 3GPP Draft; R1-103466, SS Evaluation. Sophia-Antipolis Cedex France. Jun. 22, 2010.
Intel Corporation: "Discussions on UE-RS Based PDCCH," 3GPP Draft; R1-111594, 3rd Generation Partnership Project; Barcelona, Spain; May 3, 2011.
ZTE: "Aspects on DL control signaling enhancements," 3GPP Draft; R1-111521, 3rd Generation Partnership Project, Barcelona, Spain; May 6, 2011.
Research in Motion, et al: "PDCCH Enhancement Considerations," 3GPP Draft; R1-111661 3rd Generation Partnership Project, Barcelona, Spain; May 3, 2011.
Nokia, et al: "On enhanced downlink control signalling for Rel-11," 3GPP Draft; R1-111743; 3rd Generation Partnership Project, Barcelona, Spain; May 3, 2011.
Huawei, et al: "Investigation on downlink control channel and signaling enhancements;" 3GPP Draft; R1-111253; 3rd Generation Partnership Project, Barcelona, Spain; May 3, 2011.
LG Electronics: "Discussions on DL Control Signaling Enhancement;" 3GPP Draft; R1-111789; 3rd Generation Partnership Project, Barcelona, Spain; May 5, 2011.
Ericsson, et al: "Control signaling enhancements for CA-based HetNet and inter-band deployments;" 3GPP Draft; R1-112920; 3rd Generation Partnership Project; Zhuhai; Oct. 4, 2011.
3GPP TS 36.213 V10.0.1; (Dec. 2010) 3rd Generation Partnership Project; Technical Specification Group Radio Access Network; Evolved Universal Terrestrial Radio Access (E-UTRA); Physical layer procedures (Release 10).
Huawei: "Concept for downlink carrier aggregation in LTE-Advanced," 3GPP Draft; R1-083703, 3rd Generation Partnership Project; Prague, Czech Republic; Sep. 24, 2008.
Qualcomm Europe: "Carrier Aggregation Operation in LTE-Advanced," 3GPP Draft; R1-083193, 3rd Generation Partnership Project; Jeju, South Korea; Aug. 12, 2008.
Ericsson: "Carrier aggregation in LTE-Advanced," 3GPP Draft; R1-082468, 3rd Generation Partnership Project; Warsaw, Poland; Jun. 24, 2008.
Ericsson, ST-Ericsson: "On definitions of carrier types;" 3GPP Draft; R1-100038; 3GPP TSG RAN WG1 Meeting #59bis; Valencia, Spain; Jan. 18-22, 2010.

* cited by examiner

US 9,503,239 B2

RADIO NETWORK NODE, USER EQUIPMENT AND METHODS THEREIN

TECHNICAL FIELD

Embodiments herein relate to a radio network node, a user equipment and methods therein. In particular, embodiments herein relate to handle control information in a radio communications network.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for radio communication. A radio communications network comprises radio base stations providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

Long Term Evolution (LTE) is a project within the 3rd Generation Partnership Project (3GPP) to evolve the WCDMA standard towards the fourth generation (4G) of mobile telecommunication networks. In comparisons with third generation (3G) WCDMA, LTE provides increased capacity, much higher data peak rates and significantly improved latency numbers. For example, the LTE specifications support downlink data peak rates up to 300 Mbps, uplink data peak rates of up to 75 Mbit/s and radio access network round-trip times of less than 10 ms. In addition, LTE supports scalable carrier bandwidths from 20 MHz down to 1.4 MHz and supports both Frequency Division Duplex (FDD) and Time Division Duplex (TDD) operation.

LTE is a Frequency Division Multiplexing technology wherein Orthogonal Frequency Division Multiplexing (OFDM) is used in a DL transmission from a radio base station to a user equipment. Single Carrier—Frequency Domain Multiple Access (SC-FDMA) is used in an UL transmission from the user equipment to the radio base station. Services in LTE are supported in the packet switched domain. The SC-FDMA used in the UL is also referred to as Discrete Fourier Transform Spread (DFTS)-OFDM.

The basic LTE downlink physical resource may thus be seen as a time-frequency grid as illustrated in FIG. 1, where each Resource Element (RE) corresponds to one OFDM subcarrier during one OFDM symbol interval. A symbol interval comprises a cyclic prefix (cp), which cp is a prefixing of a symbol with a repetition of the end of the symbol to act as a guard band between symbols and/or facilitate frequency domain processing. Frequencies f or subcarriers having a subcarrier spacing $\Delta f$ are defined along an z-axis and symbols are defined along an x-axis.

In the time domain, LTE downlink transmissions are organized into radio frames of 10 ms, each radio frame comprising ten equally-sized subframes, #0-#9, each with a $T_{subframe}=1$ ms of length in time as shown in FIG. 2. Furthermore, the resource allocation in LTE is typically described in terms of resource blocks, where a resource block corresponds to one slot of 0.5 ms in the time domain and 12 subcarriers in the frequency domain. Resource blocks are numbered in the frequency domain, starting with resource block 0 from one end of the system bandwidth.

Downlink and uplink transmissions are dynamically scheduled, i.e. in each subframe the radio base station transmits control information about to or from which user equipments data is transmitted and upon which resource blocks the data is transmitted. The control information for a given user equipment is transmitted using one or multiple Physical Downlink Control Channels (PDCCH). Control information of a PDCCH is transmitted in the control region comprising the first n=1, 2, 3 or 4 OFDM symbols in each subframe where n is the Control Format Indicator (CFI). Typically the control region may comprise many PDCCH carrying control information to multiple user equipments simultaneously. A downlink system with 3 OFDM symbols allocated for control signaling, for example the PDCCH, is illustrated in FIG. 3 and denoted as control region. The resource elements used for control signaling are indicated with wave-formed lines and resource elements used for reference symbols are indicated with diagonal lines. Frequencies f or subcarriers are defined along an z-axis and symbols are defined along an x-axis.

Problems have been identified with the LTE control channel. One of them is its limited capacity and another is the limitation to rely on common reference signals for demodulation, thus, reducing the performance of the radio communications network.

SUMMARY

An object of embodiments herein is to provide a mechanism that enhances the performance of a radio communications network.

According to an aspect of embodiments herein the object is achieved by a method in a user equipment for handling control information in the radio communications network. The user equipment is served in a cell controlled by a radio network node and is of a second type of user equipments, e.g. a 4G user equipment. The user equipment monitors a search space for control information of a physical data control channel, PDCCH, which search space is associated with the second type of user equipments. The PDCCH comprises at least one control channel element that comprises resource elements at least partly comprised in a second region of resource elements. The resource elements of the second region are only allowed to be scheduled for control information to user equipments of the second type. The at least one Control Channel Element, CCE, is defined in relation to a CCE of a first region of resource elements, and which resource elements of the first region are allowed to be scheduled for control information to user equipments of a first type, e.g. a 3G user equipment. The user equipment detects control information within the monitored search space, and uses the detected control information for communicating with the radio network node.

According to another aspect of embodiments herein the object is achieved by a user equipment for handling control information in a radio communications network. The user equipment is configured to be served in a cell controlled by a radio network node and is of a second type of user equipments. The user equipment comprises a monitoring circuit configured to monitor a search space for control information of a PDCCH. The search space is associated with the second type of user equipments, and the PDCCH comprises at least one control channel element that comprises resource elements at least partly comprised in a second region of resource elements. The resource elements of the second region are only allowed to be scheduled for control information to user equipments of the second type. The at least one CCE is defined in relation to a CCE of a first region of resource elements, and which resource elements of the first region are allowed to be scheduled for control information to user equipments of a first type. The user equipment further comprises a detection circuit configured to detect control information within the monitored search space, and a communication circuit configured to use the detected control information for communicating with the radio network node.

According to another aspect the object is achieved, according to some embodiments herein, by a method in a radio network node for handling scheduling of control information for a user equipment in a radio communications network. The user equipment is of a second type of user equipments and is being served in a cell controlled by the radio network node. The radio network node is comprised in the radio communications network. The radio network node maps control information for the user equipment to a PDCCH, which PDCCH is associated with the second type of user equipments. The PDCCH comprises at least one control channel element that comprises resource elements at least partly comprised in a second region of resource elements. The resource elements of the second region are only allowed to be scheduled for control information to user equipments of the second type. The at least one CCE is defined in relation to a CCE of a first region of resource elements. The resource elements of the first region are allowed to be scheduled for control information to user equipments of a first type. The radio network node transmits the control information over the PDCCH to the user equipment.

According to embodiments herein the object is achieved by a radio network node for handling scheduling of control information for a user equipment in a radio communications network. The user equipment is of a second type of user equipments and is served in a cell controlled by the radio network node. The radio network node comprises a mapping circuit configured to map the control information for the user equipment to a PDCCH, which PDCCH is associated with the second type of user equipments. The PDCCH comprises at least one control channel element that comprises resource elements at least partly comprised in a second region of resource elements. The resource elements of the second region are only allowed to be scheduled for control information to user equipments of the second type. The at least one CCE is defined in relation to a CCE of a first region of resource elements, and the resource elements of the first region are allowed to be scheduled for control information to user equipments of a first type. The radio network node further comprises a transmitter configured to transmit the control information over the PDCCH to the user equipment.

Embodiments herein provide a search space to be monitored. The search space comprises resource elements of the second region providing an extended control channel that provides control channel elements that are accessible for the second type of user equipments with an improve capacity without reducing the resource elements for control information of the first type of user equipments.

BRIEF DESCRIPTION OF THE DRAWINGS

Embodiments will now be described in more detail in relation to the enclosed drawings, in which.

DETAILED DESCRIPTION

Figure 1:
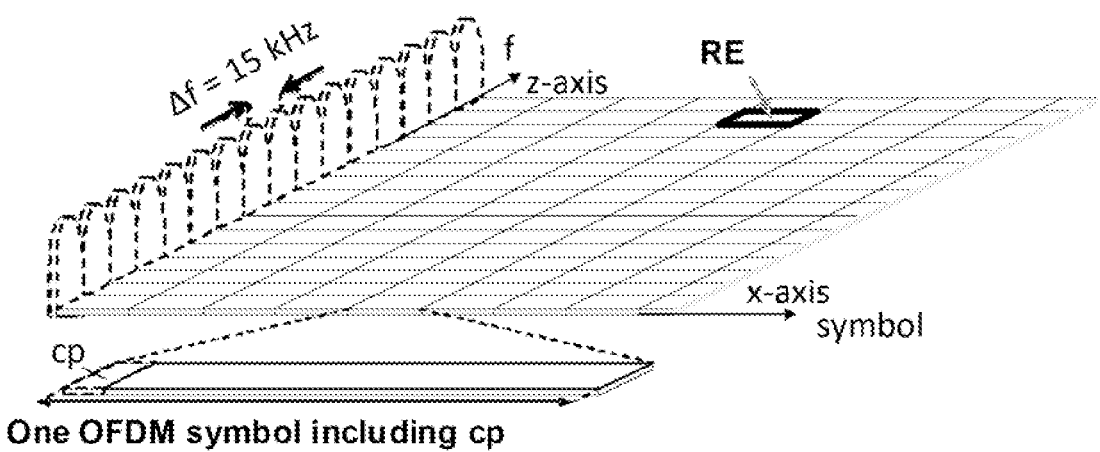
FIG. 1 is a schematic block diagram of a LTE downlink physical resource.
Figure 2:
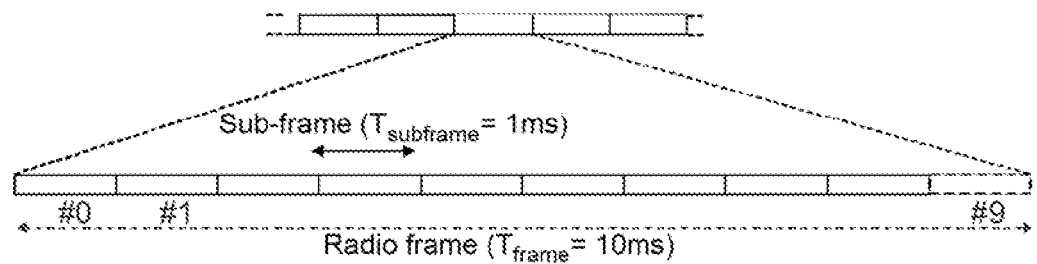
FIG. 2 is a schematic overview depicting radio frames.
Figure 3:
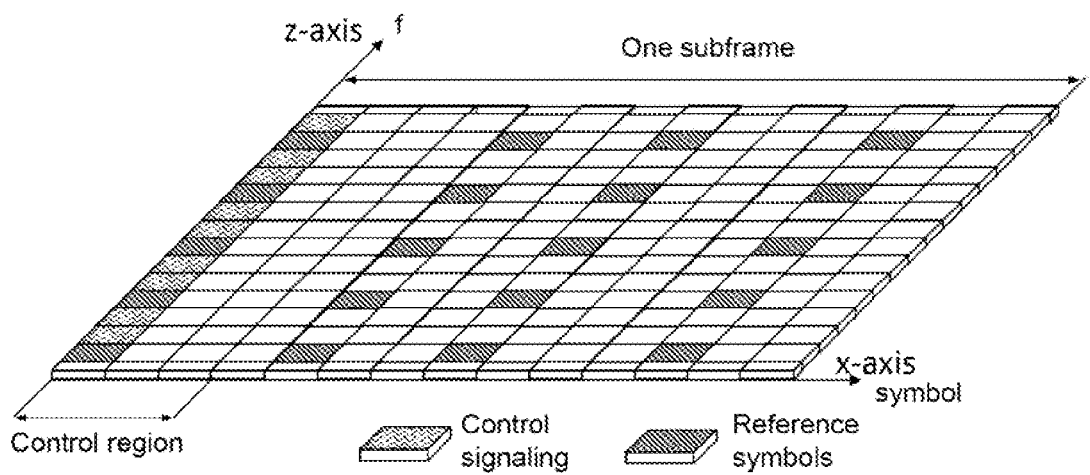
FIG. 3 is a schematic overview depicting a DL subframe.
Figure 4:
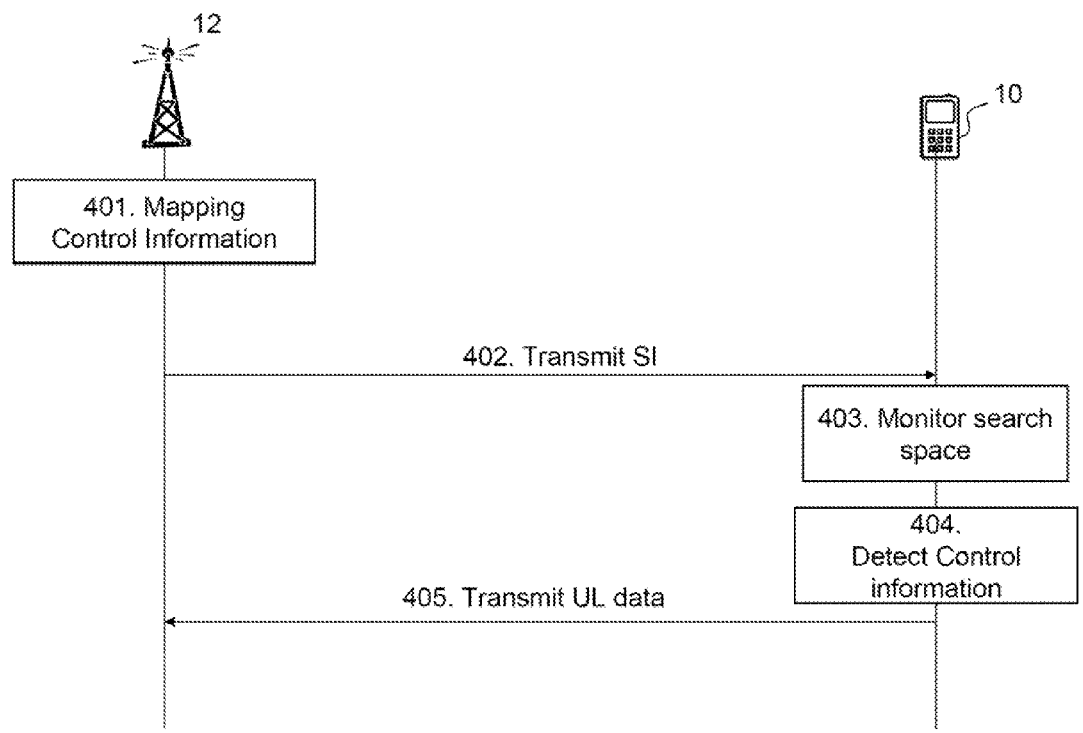
FIG. 4 is a schematic combined flowchart and signalling scheme depicting embodiments of a method in the radio communications network.

FIG. 4 is a schematic combined flowchart and signaling scheme in a radio communications network, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB). The radio communications network comprises a radio network node, e.g. a radio base station 12, providing radio coverage over at least one geographical area forming a cell. The cell definition may also incorporate frequency bands used for transmissions, which means that two different cells may cover the same geographical area but using different frequency bands. A user equipment 10 is served in the cell by the radio base station 12 and may be communicating with the radio base station 12. The user equipment 10 transmits data over an air or radio interface to the radio base station 12 in uplink (UL) transmissions and the radio base station 12 transmits data over an air or radio interface to the user equipment 10 in downlink (DL) transmissions.

It should be understood that the term "user equipment" is a non-limiting term which means any wireless terminal, device or node e.g. Personal Digital Assistant (PDA), laptop, mobile, sensor, relay, mobile tablets, an LCS target device in general, an LCS client in the network or even a small base station.

The radio base station 12, which is an example of a radio network node, may also be referred to as e.g. a NodeB, an evolved Node B (eNB, eNode B), a base transceiver station, Access Point Base Station, base station router, or any other network unit capable to communicate with a user equipment 10 within the cell depending e.g. of the radio access technology and terminology used. Also, the radio base station 12 may further serve one or more cells. The radio network node serving the user equipment 10 may further be exemplified as a relay node or a beacon node.

Embodiments herein allow a control region of resource elements to be extended with resource elements, thereby overcoming the current limitation of capacity and allowing control transmissions in defined regions in the OFDM time-frequency grid. The extension of resource elements allows for the use of user equipment specific reference signals for demodulation, which in turn enables the use of beamforming for the control channel, and other non-backward compatible solutions to enhance the control channel. Note that such extension of resource elements is only accessible for non-legacy user equipments, herein referred to as a second type of user equipments such as user equipments of release 11 or higher also referred to as 4G user equipment:

Given such an extension of resource elements, embodiments herein disclose how to integrate the extended control channel with a legacy control channel in a robust manner without introducing interference and also how to keep a PDCCH scheduling blocking probability small. A region of resource elements, referred to as a second region herein or extended control region, is introduced which comprises additional physical Resource Elements (RE) which are reserved for transmission of control channels. A search space for second type user equipments may then be defined, according to some embodiments, as partially overlapped with a search space for legacy user equipments, herein referred to as a first type of user equipments such as user equipments of release 10 or lower, e.g. a 3G user equipment, over a first region of resource elements. The search spaces, also referred to as additional search spaces, may be left-aligned with the highest aggregation level of the search spaces for first type of user equipments and is in addition also using Control Channel Elements (CCE) in the extended control region, which are non-accessible for user equipments of the first type.

An advantage with some embodiments herein is that the search space may be integrated with CCEs for the first types of user equipments. Furthermore, the search space may be interference free. In addition, the search space may minimize the blocking probability and may also utilize resource elements in the first region that cannot be used by the first type of user equipments. Additionally, the search space may maintain a single common search space for first and second types of user equipments, see FIG. 10 below, and the search space is agnostic to how an extended control channel is mapped to physical resources. An example will now be described in reference to FIG. 4.

Step 401. The radio base station 12 maps modulated control information of a PDCCH for the user equipment 10, which is of the second type, to resource elements in the second region. Thus, the PDCCH comprises at least one CCE that comprises resource elements at least partly comprised in the second region of resource elements. The resource elements of the second region are only allowed to be scheduled for control information to user equipments of the second type. The resource elements of the first region are allowed to be scheduled for control information to user equipments of the first type alternatively allowed for first type and second type of user equipments.

The at least one CCE may be defined in relation to a CCE in the first region. E.g. the search space comprising the at least one CCE of a user equipment of the second type may be offset in relation to a CCE of a search space of the first type of user equipments. Additionally or alternatively, the at least one CCE or search space may be defined as aligned with CCEs or aggregation levels of CCEs of the search space of the first type of user equipments.

Step 402. The radio base station 12 then transmits the control information over the PDCCH to the user equipment 10.

Step 403. The user equipment 10 monitors the search space for the second type of user equipments which comprises CCEs in the second region and in some embodiments also CCEs in the first region of resource elements. The user equipment 10 may blindly monitor all possible search spaces for control information.

Step 404. The user equipment 10, e.g. when decoding the control information, detects control information within the monitored search space of the second type of user equipments. If a Cyclic Redundancy Check (CRC) is valid, then the content of the PDCCH, i.e. the control information, is assumed valid for the user equipment 10.

Step 405. The user equipment 10 then uses this control information e.g. to transmit uplink data using a radio resource indicated in the control information.

Figure 5:
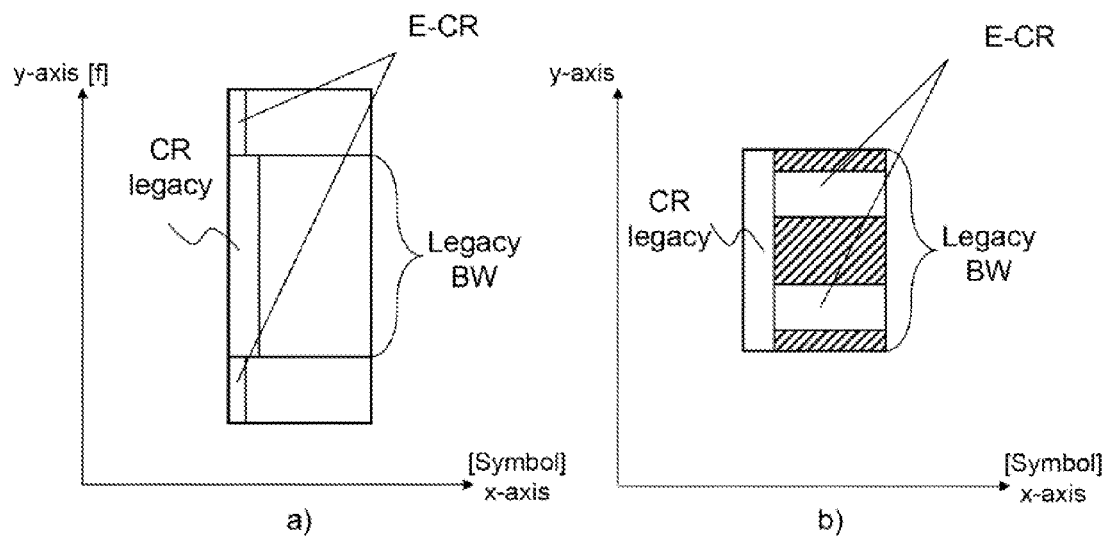
FIGS. 5a-5b are schematic examples of control regions for the transmission of control information according to embodiments herein.

FIG. 5a is a block diagram of an evolved downlink control channel design, where extended (E)-Control Regions (CR) in the downlink time-frequency OFDM grid have been reserved for the transmission of control information. The x-axis defines symbols and the y-axis defines frequencies. One example of such an extended control regions is the use of an extended carrier where a smaller legacy bandwidth is extended by a one- or two-sided expansion. The E-CR may be defined in such extension to be used for control channel transmission. Control information for user equipment of the second type is mapped in the E-CR and control information for user equipment of the first type is mapped in a legacy CR within a legacy bandwidth (BW).

FIG. 5b is a block diagram depicting a downlink control channel design. In LTE there is also a Relay-PDCCH (R-PDCCH) defined, which is used for downlink control signalling to relays. The x axis defines symbols and the y-axis defines frequencies. One or multiple regions in a data part of the subframe are in this case used for control signalling denoted as E-CR. These may also be utilized in embodiments herein as a new in-band region within the legacy bandwidth (BW) for the transmission of control information to new user equipments of the second type. This in-band region may be referred to as Enhanced PDCCH or Extended PDCCH (E-PDCCH). The regions still kept for transmission of user data are striped with diagonal lines.

Also a combination of extended carrier and in-band regions is possible for defining E-CR.

Figure 6:
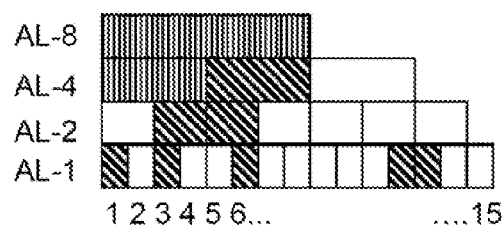
FIG. 6 is a schematic overview depicting embodiments of control channel elements.

FIG. 6 is a schematic overview depicting Aggregation Levels (AL) 8,4,2 and 1 of CCE aggregations in a CCE domain, thus CCEs are defined along an x-axis. The radio base station 12 may channel code, scramble, modulate and interleave of the control information. Then the radio base station 12 maps the modulated symbols to the resource elements in the different control regions. To multiplex multiple PDCCH onto a control region, control channel elements (CCE) have been defined where each CCE maps to 36 resource elements. One PDCCH may, depending on the information payload size and the required level of channel coding protection, comprises 1, 2, 4 or 8 CCEs, and the number is denoted as the CCE Aggregation Level (AL). By choosing the aggregation level, link-adaptation of the PDCCH obtained. For example, if an LTE scheduler schedules control information in a Format 1A Downlink Control Information (DCI) of length 28 bits and then adds a check value of 16 bits to the 28 bits; 28 bits+16 bits=44 bits. The check value may be a short, fixed-length calculated binary sequence, also known as the check value or the Cyclic Redundancy Check (CRC) value, for the control information. The user equipment 10 checks based on the check value if received data comprises data error or not. Now the 44 bits can be mapped to a PDCCH with different CCE aggregation levels as follows. The 44 bits may be mapped to PDCCH format 0, used for uplink scheduling, where the CCE AL-1 size is 72 bits, or 36 REs of 2 bits; then the 44 bits are converted into 72 bits using coding rate 44/72. The 44 bits may be mapped using CCE AL-2, which size is 144 bits, then the 44 bits are converted into 144 bits using coding rate 44/144. The 44 bits may be mapped using CCE AL-4, which size is 288 bits, and then the 44 bits are converted into 288 bits using coding rate 44/288. The 44 bits may be mapped using CCE AL-8, which size is 576 bits, and then the 44 bits are converted into 576 bits using coding rate 44/576.

In total there are $N_{CCE}$ CCEs available for all the PDCCH to be transmitted in the subframe. $N_{CCE}$ defines a number of CCEs and the number $N_{CCE}$ varies from subframe to subframe depending on the number of control symbols n. As $N_{CCE}$ varies from subframe to subframe, the user equipment 10 may need to blindly determine the position and the number of CCEs used for its PDCCH which can be a computationally intensive decoding task. Therefore, some restrictions in the number of possible blind decodings the user equipment 10 needs to go through have been introduced. For instance, the CCEs are numbered and CCE aggregation levels of size K can only start on CCE numbers evenly divisible by K.

The set of CCEs where the user equipment 10 needs to blindly decode and search for a valid PDCCH is called a search space indicated in FIG. 6 as diagonal striped CCEs. This is the set of CCEs on an aggregation level the user equipment 10 should monitor for scheduling assignments or other control information. In each subframe and on each aggregation level, the user equipment 10 will attempt to decode all the PDCCHs that can be formed from the CCEs in its search space. If the CRC value is valid, then the content of the PDCCH is assumed to be valid for the user equipment 10 and the user equipment 10 further processes the received control information. Two or more user equipments may have overlapping search spaces and the radio network node, e.g. radio base station 12, may select one of them for scheduling of the control channel. If a user equipment cannot be assigned to any PDCCH in its search space because all CCEs are assigned to other user equipments having an overlapping or partly overlapping search space, the non-scheduled user equipment cannot be scheduled in this subframe and is said to be blocked. The search spaces vary pseudo-randomly and are different for each user equipment from subframe to subframe to minimize this blocking probability.

A search space may further be divided to a common and a user equipment specific part. In the common search space, indicated in FIG. 6 as vertically striped CCEs, the PDCCH comprising information to all or a group of user equipments is transmitted such as paging, system information etc. If carrier aggregation is used, a user equipment 10 will find the common search space present on a Primary Component Carrier (PCC) only.

Component Carriers may be classified into a Primary Component Carrier and a Secondary Component Carrier (SCC) whether it is activated. The PCC may always be activated, and the SCC is activated or deactivated according to specific conditions. The term 'activation' means that traffic data are being transmitted or received or are in a ready state. The term 'deactivation' means that the transmission or reception of traffic data is impossible, but measurement or the transmission or reception of minimum information is possible.

The common search space may be restricted to aggregation levels 4 and 8 to give sufficient channel code protection for all user equipments in the cell 11 since it is a 20 broadcast channel, link adaptation cannot be used. The first PDCCH with lowest CCE number in an AL of 8 or 4 respectively belongs to the common search space. For efficient use of the CCEs in the system, the remaining search space is UE specific at each aggregation level. Some embodiments herein maintain a common search space, common for first and second type of user equipments and with full cell coverage, when an extended control region is introduced.

In total there are $N_{CCE}=15$ CCEs in the illustrated example. A CCE comprises 36 QPSK modulated symbols that map to the 36 RE unique for this CCE. To maximize the diversity and interference randomization, interleaving of all the CCEs is used before a cell specific cyclic shift and mapping to REs. Note that in most cases some CCEs are empty due to the PDCCH location restriction to user equipment search spaces and aggregation levels. The empty CCEs are included in the interleaving process and mapping to RE as any other PDCCH to maintain the search space structure. Empty CCE are set to zero power and this power can instead be used by non-empty CCEs to further enhance the PDCCH transmission.

Furthermore, to enable the use of 4 antenna TX diversity, a group of 4 adjacent QPSK symbols in a CCE is mapped to 4 adjacent RE, denoted a RE Group (REG). Hence, the CCE interleaving is quadruplex, group of 4, based and mapping process has a granularity of 1 REG and one CCE corresponds to 9 REGs which 36 REs. There will also in general be a collection of REG that remains as leftovers after the set of size $N_{CCE}$ CCEs has been determined, although the leftover RE of the REGs are always fewer than 36 RE, since the number of REGs available for PDCCH in the system bandwidth is in general not an even multiple of 9 REGs. These leftover REGs may be used by embodiments herein.

According to embodiments herein the search space or CCEs of the search space is at least partly comprised in the second region.

Figure 7:
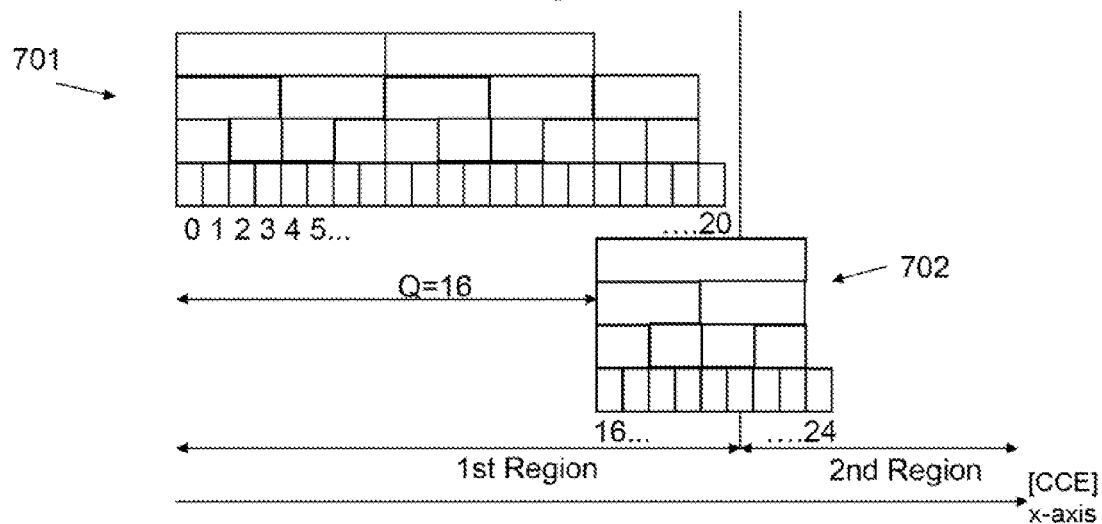
FIG. 7 is a schematic overview depicting embodiments of control channel elements.

FIG. 7 is a schematic overview of CCEs and aggregation levels of the CCEs of different types of user equipments. CCEs are defined along an x-axis. Possible search spaces of the first type of user equipments are denoted 701 and possible search spaces of the second type of user equipments is denoted 702. The first region of each serving cell comprises a set of CCEs, numbered from 0 to $N_{CCE,k}-1$, where $N_{CCE,k}$ is a total number of CCEs in the first region of subframe k. The user equipment 10 is configured to monitor for search space comprising resource elements in the second region, being different than the resource elements in the first region. The search space may comprise a set of CCEs, numbered from Q to $Q+N_{CCE,k}^{(2)}-1$ where Q is a configured CCE number offset of possible search spaces relative to possible search spaces of the first type of user equipments and $N_{CCE,k}^{(2)}$ is a total number of CCEs in the second region of subframe k.

The user equipment 10 may monitor a set of PDCCH candidates on one or more activated serving cells as configured by higher layer signalling for control information in every non-DRX subframe. The monitoring implies attempting to decode each of the PDCCHs in the set according to all the monitored DCI formats.

The set of PDCCH candidates to monitor are defined in terms of search spaces, where a search space $S_k^{(L)}$ at aggregation level $L\in\{1,2,4,8\}$ is defined by a set of PDCCH candidates. For each serving cell on which PDCCH is monitored, the CCEs corresponding to PDCCH candidate m of the search space $S_k^{(L)}$ are given by $$L\{(Y_k+m')\bmod\lfloor N_{CCE,k}/L\rfloor\}+i$$

where $Y_k$ is defined below, i=0, ..., L−1. For the common search space m'=m. For the UE specific search space of a UE not configured to monitor an additional search space for the serving cell on which PDCCH is monitored, if the monitoring user equipment 10 is configured with carrier indicator field then $m'=m+M^{(L)}\cdot n_{CI}$ where $n_{CI}$ is the carrier indicator field value, else if the monitoring UE 10 is not configured with carrier indicator field then m'=m, where m=0, ..., $M^{(L)}$−1. $M^{(L)}$ is the number of PDCCH candidates to monitor in the given search space.

For each serving cell on which PDCCH is monitored, the CCEs corresponding to PDCCH candidate m of the search space $S_k^{(L)}$ for the user equipment 10 configured to monitor an additional search space are given by $$L\{(Y_k+m')\bmod\lfloor N_{CCE,k}^{(2)}/L\rfloor\}+i+Q$$

where $Y_k$ is defined below, i=0, ..., L−1. For the UE specific search space of a UE configured to monitor the additional search space, for the serving cell on which PDCCH is monitored, if the monitoring user equipment 10 is configured with carrier indicator field then $m'=m+M^{(L)}\cdot n_{CI}$ where $n_{CI}$ is the carrier indicator field value, else if the monitoring UE is not configured with carrier indicator field then m'=m, where m=0, ..., $M^{(L)}$−1. $M^{(L)}$ is the number of PDCCH candidates to monitor in the given search space. The equation points out a subset of CCEs e.g. diagonally striped in FIG. 6.

In the illustrated example the first control region comprises 21 CCEs numbered from 0-20. The possible search spaces of the second type are offset, Q, 16 CCEs, i.e. Q=16, relative the first CCE of the first control region. The offset is expressed in a logical CCE domain. The offset Q may be introduced which distinguish the CCEs used for the first and the second control region. For a first type user equipment nothing changes. For a Rel.11 UE or a user equipment of a second type, e.g. the user equipment 10, which is configured to monitor an additional search space, i.e. search space of a second type, the total number of defined CCEs is larger. The user equipment 10 will still monitor the same common control channel as a first type user equipment but will monitor the UE specific search space in the search space for the second type of user equipments. The offset Q is introduced for the user equipment 10 which simply is which CCE number the search space starts that is in the logical CCE numbering domain. The value Q is then configured by higher layers. Q may be selected to align with the granularity with the Aggregation Levels to avoid interference. On aggregation level L, the proper, interference free alignment implies that $$Q=L\cdot q_L$$

where $q_L$ is a positive integer that depends on the aggregation level L. This alignment rule must hold for all the aggregation levels $L\in\{1,2,4,8\}$.

The possible search spaces 702 for the second type of user equipments is left-aligned with the highest aggregation level of the search space for first type of user equipments and is in addition also using the CCEs in the second region, which are non-accessible for first type of user equipments. Left-aligned here means that the first CCE of the search spaces for second type of user equipment follows the last CCE of the highest aggregation level of the search space for first type of user equipments.

Figure 8:
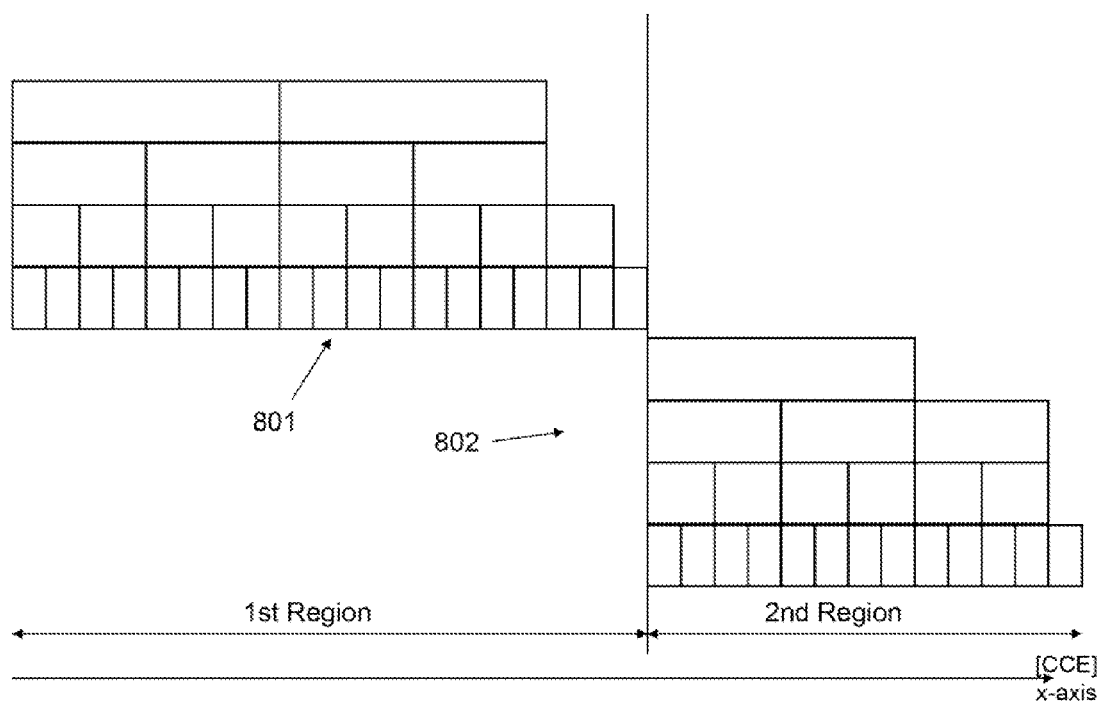
FIG. 8 is a schematic overview depicting embodiments of control channel elements.

FIG. 8 is a block diagram depicting control channel elements of search spaces for the first type of user equipments and the second type of user equipments. CCEs are defined along an x-axis. The possible search spaces for the first type of user equipments is denoted 801 and the possible search spaces, additional search spaces, of the second type of user equipments is denoted 802. The CCEs in the additional search space are in the illustrated example are restricted to lie in the second region of resource elements. The additional search space is user equipment specific only and the common search space remains in the first region, also referred to as the legacy region. In the illustrated embodiment, the additional user equipment specific search space is restricted to CCEs in the second region. The common search space for the second type of user equipments may then be equal to the common search space for legacy user equipment in the legacy region, as to maintain the number of blind decoding unchanged and to keep the backward compatibility.

These embodiments have an advantage that there is no increased blocking probability between the first type of user equipments and second type of user equipments since their search spaces are always disjoint. Another advantage is that the user equipment specific search space may be transmitted using user specific beamforming as it belongs to the second region, whereas the common search space, which is received by multiple user equipments in the cell, can be transmitted using transmit diversity or single antenna transmission to provide full cell coverage. However, theses embodiments provide only a limited number of CCEs for the search space of second type of user equipments and thus limited control channel capacity for these second type of user equipments, especially when the second region is small. This may lead to an increased blocking probability between user equipments of the second type. On the other hand, since the different search spaces 701 are non-overlapping in these embodiments, i.e $Q=N_{CCE,k}$, the number of RE used per CCE may be different between CCEs in the first and second region respectively. Due to backward compatibility, a CCE in the first region may be 36 RE but a CCE belonging to the second region could use a smaller or larger number of RE per CCE compared to the first region. This allows for a more flexible design of the second control region and possibility to increase PDCCH capacity, smaller CCE, or increase PDCCH coverage, larger CCE.

Figure 9:
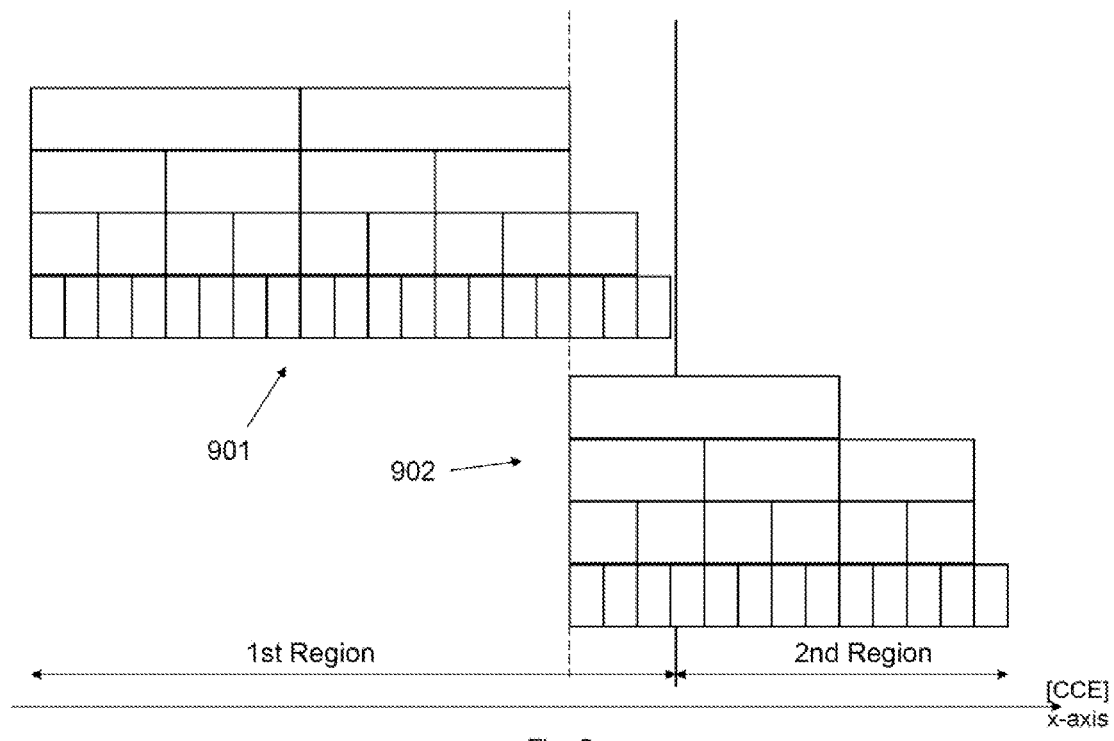
FIG. 9 is a schematic overview depicting embodiments of control channel elements.

FIG. 9 is a block diagram depicting control channel elements of search spaces for the first type of user equipments and the second type of user equipments. CCEs are defined along an x-axis. The possible search spaces for the first type of user equipments is denoted 901 and the possible search spaces, additional search spaces, of the second type of user equipments is denoted 902. An overlap between the possible search spaces i.e. re-use of the CCEs is introduced for first and second type of user equipments. The search spaces 902 i.e. the group of CCEs, for the second type of user equipments are left-aligned with the highest aggregation level of the search spaces 901 of the first type of user equipments, the dashed line shows alignment. Note that the highest aggregation level of first type of user equipments may sometimes be less than 8. Embodiments herein disclose where the search spaces 902, available set of CCEs, for the second type of user equipments are partially overlapping with the search spaces 901 for the first type of user equipments.

By this arrangement of an alignment, some CCEs are shared by the first and second types of user equipments and there is therefore the same mapping to physical resources of a CCE for the first and second types of user equipments. This will simplify the avoidance of collisions between the corresponding PDCCHs. Furthermore, the leftover REs in the first region are in these embodiments used by CCEs for the second type of user equipments, thereby increasing the utilization of the first region. Also, the number of CCEs available for the second type of user equipments is larger than that of FIG. 8, thereby increasing the related control channel capacity and reducing the blocking probability.

Figure 10:
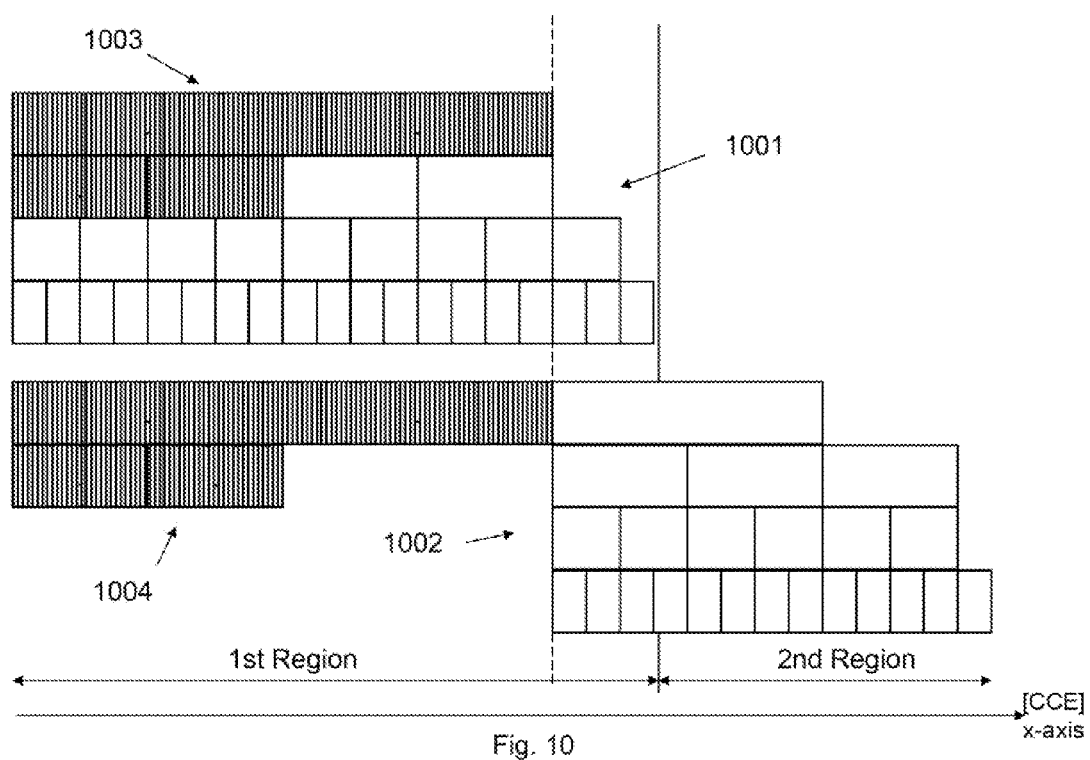
FIG. 10 is a schematic overview depicting embodiments of control channel elements.

FIG. 10 is a block diagram depicting control channel elements of search spaces for the first type of user equipments and the second type of user equipments according to some embodiments. CCEs are defined along a x-axis. The possible search spaces for the first type of user equipments is denoted 1001 and the possible search spaces, additional search spaces, of the second type of user equipments is denoted 1002. In these embodiments the left alignment is selected so that there is no overlap between a common search space 1003 in the first region and the user equipment specific search spaces for the second type of user equipments. This will reduce the blocking probability for the common control channels. Embodiments herein disclose where the user equipment specific search spaces, available set of CCEs, for the second type of user equipments are partially overlapping but left aligned with the search spaces for the first type of user equipments. The search spaces for the second type of user equipments are left-aligned so that the common search space, marked by vertical stripes, is non-overlapping with the search spaces of the second type of user equipments. Thus, a second common search space 1004 of the user equipments of the second type is shared with the common search space 1003.

Figure 11:
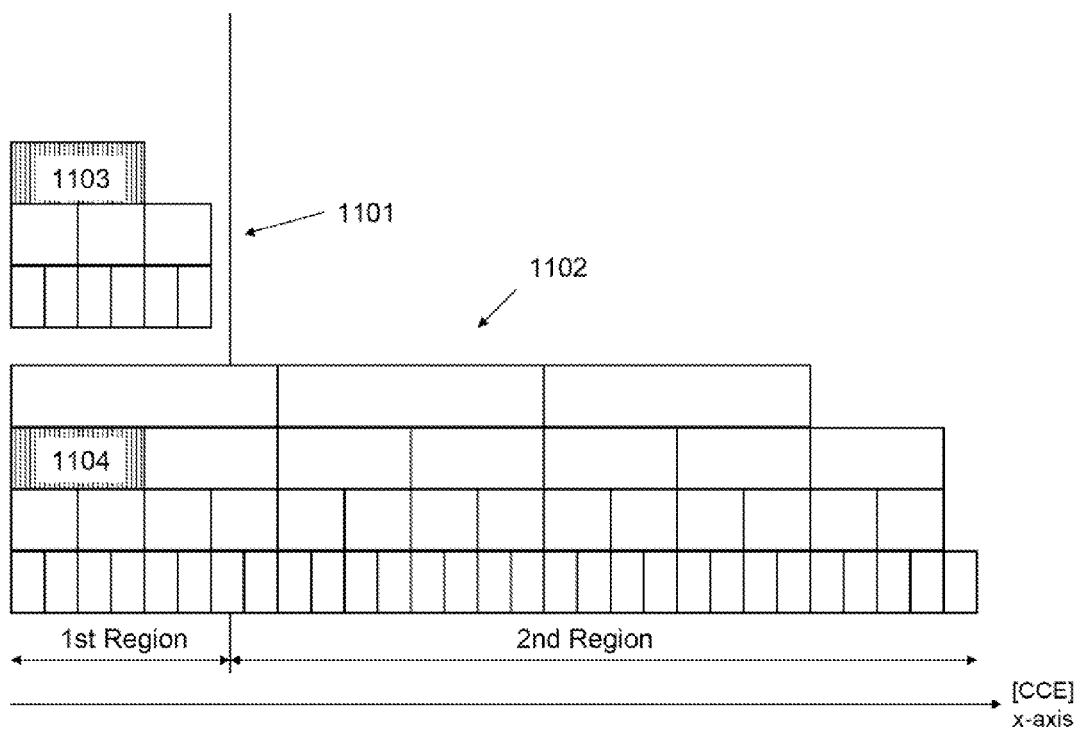
FIG. 11 is a schematic overview depicting embodiments of control channel elements.

FIG. 11 is a block diagram depicting embodiments of control channel elements of search spaces 1101, 1102 for the first type of user equipments and for the second type of user equipments. CCEs are defined along an x-axis. In these embodiments, a candidate search space for the second type of user equipments is partially or fully overlapping with a common search space 1103. A fully overlapping search space is where the CCEs are aligned between the first and second types of user equipments. Note that since the bandwidth of the first type of user equipments is small, no aggregation level of 8 exists for the first type of user equipments in this example. Embodiments herein disclose where possible search spaces 1102, available set of CCEs, for the second type of user equipments, are fully overlapping and left aligned with possible or candidate search spaces 1101 for the first type of user equipments. The common search spaces 1003, 1104, if they exist, are marked by vertical stripes and may be the same for the first and second type of user equipments as indicated.

Figure 12:
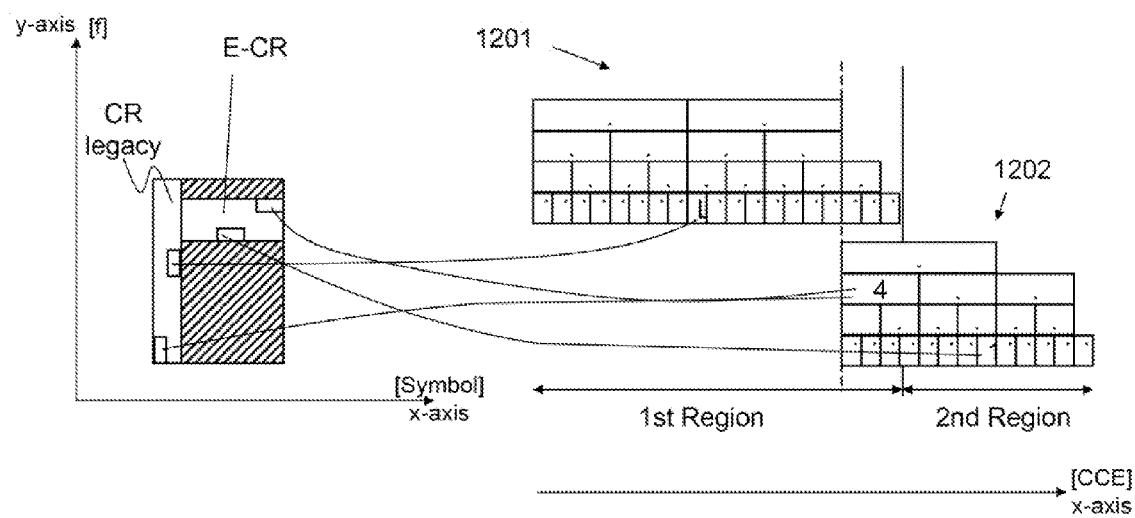
FIG. 12 is a schematic overview depicting embodiments of resource elements and control channel elements.

FIG. 12 is a schematic overview depicting control channel elements of search spaces for the first type of user equipments and the second type of user equipments. Due to backward compatibility reasons, the REG-based interleaving and mapping to physical resources for the first type of user equipments remains unchanged. The second region has its own interleaver and mapper to the REs in the second region, which in some embodiments is REG-based and uses the same algorithm as the interleaver and mapper for the first region. In some alternative embodiments, the interleaver and mapper has the granularity of a single RE instead of a RE Group (REG) of 4 RE for increased diversity and interference randomization.

A PDCCH that is fully comprised in the search space of the first type of user equipments will then be interleaved and mapped to the REGs in the first region. A PDCCH fully comprised in the extended region, the second region, will be interleaved and mapped to physical resources in the E-CR only. Finally, a PDCCH that extends both into the first and second regions will have its components distributed over both the bandwidth of the first type of user equipments and the E-CR where each component has the granularity of one REG. For example, a PDCCH may comprise 4 CCE, denoted as '4', that is in the additional search space for second type of user equipments and is overlapping between the first region and is thus partially mapped to a CR legacy of first type of user equipments and partially to the E-CR, here exemplified as an in-band control channel extension, not all REG of the PDCCH is shown. A sole CCE denoted as '1' is, since it exists in the second region only, mapped to the E-CR and the sole CCE of a search space for first type of user equipments denoted as 'L' is mapped only to the CR legacy for the first type of user equipments.

When the PDCCH is overlapping between first and second regions, the size of the first region must remain unaltered for backward compatibility reasons. Hence, the size of the first region, measured in the number of available RE, remains a multiple of one CCE or equivalently 36 RE. Assume there are $N_{leftover}$ REs where $0 \le N_{leftover} \le 35$ of which $N_{ext}$ may be harvested and used by the CCEs in the extended second region. If REG based interleaving and mapping is used in the extended second region as well, then $N_{ext}$ must be a multiple of 4 so at most $N_{ext}=4*floor(N_{leftover}/4)$ may be harvested into the extended second region and the amount of unused resources is thereby reduced to $N_{leftover} - N_{ext} \le 3$. If on the other hand RE based interleaving and mapping is used, then all resources may be harvested by the extended second region.

A processing chain for a PDCCH of a second type of user equipments into the E-CR is as follows: After scrambling and modulation, layer mapping takes place, if spatial multiplexing or transmit diversity is used, and then the channels are interleaved on REG, i.e. quadruplexed, basis. The channels are then cyclically shifted based on Cell ID and mapped to the REG in the control region of the second region, first in time direction and then frequency direction. The new control channels may in one embodiment use the same algorithm for the interleaver as used for the channels.

Figure 13:
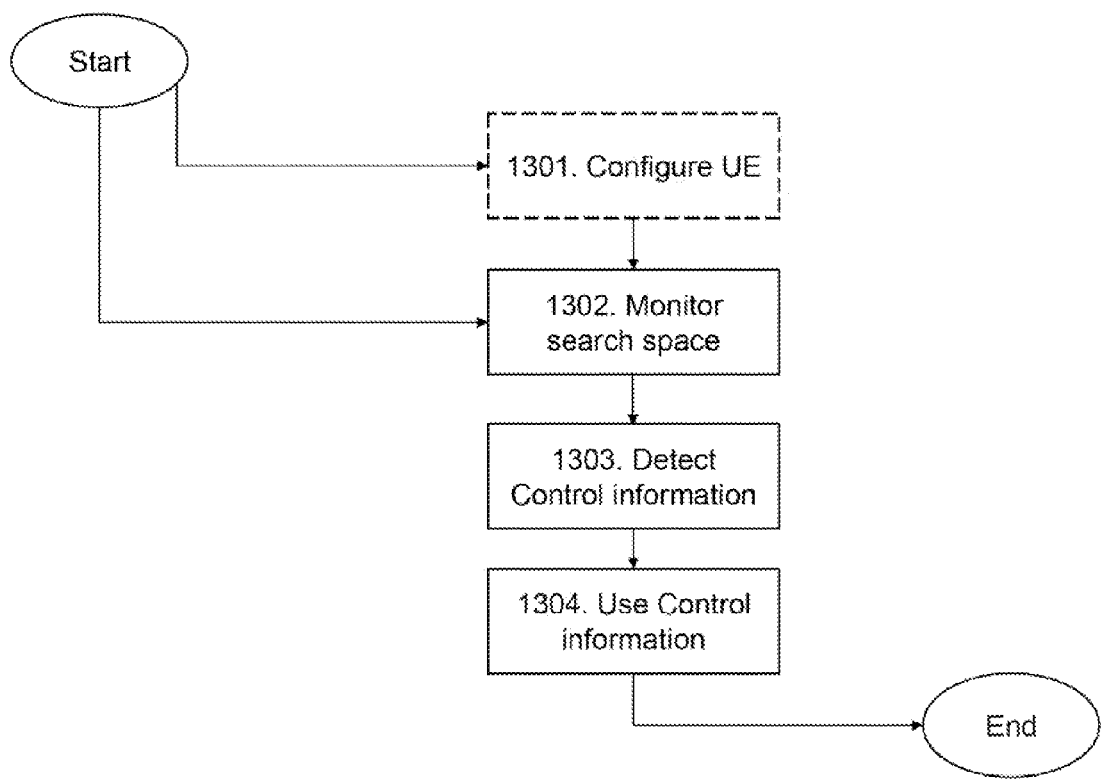
FIG. 13 is a flow chart of embodiments of a method in a user equipment.

The method steps in the user equipment 10 for handling control information in a radio communications network, according to some embodiments will now be described with reference to a flowchart depicted in FIG. 13. The steps do not have to be taken in the order stated below, but may be taken in any suitable order. The user equipment 10 is served in a cell controlled by the radio network node, e.g. the radio base station 12, and is of a second type of user equipments, e.g. a 4G user equipment. The dashed boxes indicate that these steps are only performed in some embodiments.

Step 1301. The user equipment 10 may be configured to perform the monitoring below.

Step 1302. The user equipment 10 monitors a search space for control information of a PDCCH, which search space is associated with the second type of user equipments. The PDCCH comprises at least one control channel element that comprises resource elements at least partly comprised in a second region of resource elements. The resource elements of the second region are only allowed to be scheduled for control information to user equipments of the second type. The at least one CCE is defined in relation to a CCE of a first region of resource elements, and the resource elements of the first region are allowed to be scheduled for control information to user equipments of a first type.

In some embodiments the resource elements of the at least one control channel element are fully comprised in the second region of resource elements.

In some embodiments the resource elements of the first region are further allowed to be scheduled for control information to user equipments of the second type. The resource elements of the at least one control channel element are then further partly comprised in the first region of resource elements. In some embodiments the resource elements of the second region are resource elements of an extended carrier and/or of an in-band region of a data part of a subframe. This in-band region may be referred to as Enhanced-PDCCH (E-PDCCH).

In some embodiments the at least one control channel element is offset Q in relation to a control channel element of the first type of user equipments in the CCE domain. The offset is defined in control channel elements in the monitored search space. The offset Q in control channel elements may in some embodiments be aligned according to $Q = L \cdot q_L$ for all aggregation levels $L \in \{1,2,4,8\}$. L is aggregation level and $q_L$ is a positive integer. In some embodiments the monitored search space, also referred to as UE specific search space, for the second type of user equipments is obtained as $$L\{(Y_k + m') \bmod \lfloor N_{CCE,k}^{(2)}/L \rfloor\} + i + Q$$

where L is aggregation level,
i=0, ..., L−1,
$Y_k = (A Y_{k-1}) \bmod D$,
  where A=39827, D=65537 $k = \lfloor n_s/2 \rfloor$ where $n_s$ is a slot number within a radio frame and $Y_{-1} = n_{RNTI} \neq 0$ where $n_{RNTI}$ is a user equipment radio network temporary identifier;
and when the monitoring user equipment 10 is configured with a carrier indicator field value
m'=m+$M^{(L)} \cdot n_{CI}$, where $n_{CI}$ is the carrier indicator field value; else if the monitoring user equipment 10 is not configured with carrier indicator field value then
m'=m , where m=0, ..., $M^{(L)}$−1,
  m is a PDCCH candidate,
  $M^{(L)}$ is a number of PDCCH candidates to monitor in the given search space;
  $N_{CCE,k}^{(2)}$ is a total number of control channel elements in the second region of subframe k,
  Q is the offset in control channel elements.

In some embodiments the type of user equipments is defined by characteristics of the user equipment 10 e.g. capability or a release of the user equipment. The user equipment 10 may in some embodiments decode the PDCCH in the search space when monitoring the PDCCH.

Step 1303. The user equipment 10 detects control information in the monitored search space.

Step 1304. The user equipment 10 uses the detected control information when communicating with the radio network node 12. E.g. the user equipment 10 may transmit data according to the control information or may receive data according to the control information.

Embodiments herein provide some advantages, e.g. a search space for an extended control channel, accessible for new user equipments, being of the second type. The CCEs of the search space may be integrated with CCEs for user equipment of the first type. The search space may be interference free or minimize the blocking probability. The search space may utilize resource elements in the first region that cannot be used by the first type of user equipment and/or maintain a single common search space for first 5 and second type of user equipments. The search space may be agnostic to how the extended control channel is mapped to physical resources.

Figure 14:
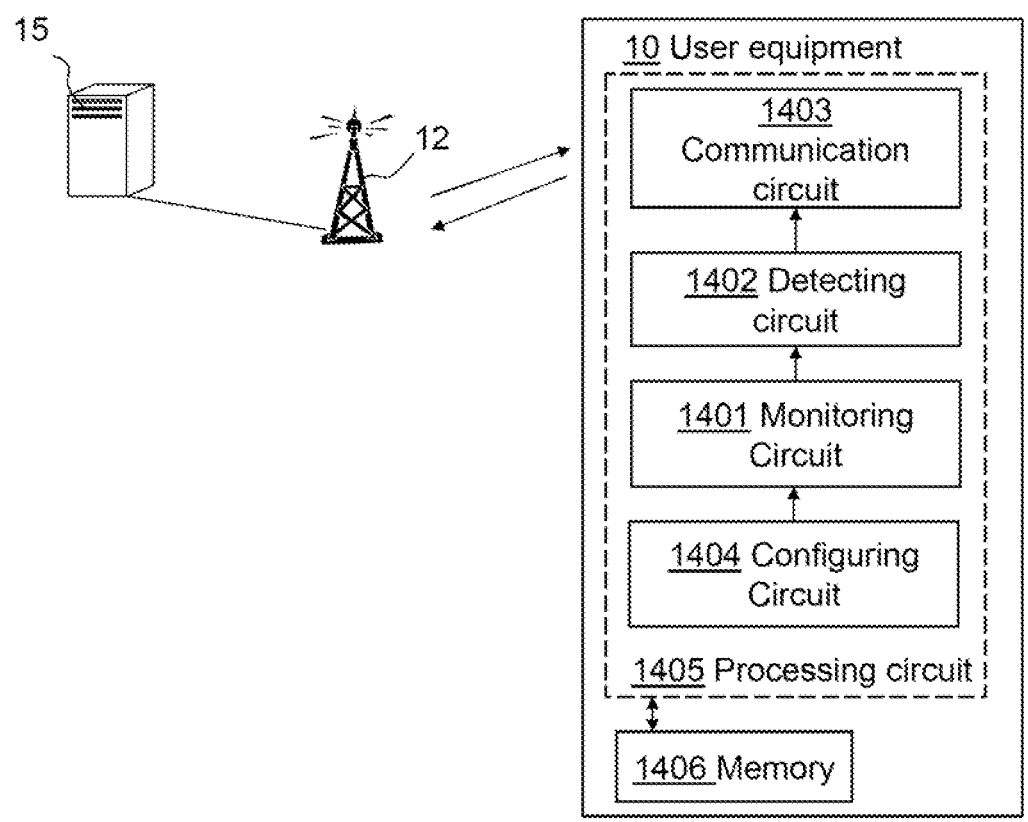
FIG. 14 is a block diagram depicting embodiments of a user equipment.

FIG. 14 is a block diagram depicting the user equipment 10 for handling control information in a radio communications network according to embodiments herein. The user equipment 10 is configured to be served in a cell controlled by a radio network node 12 and is of a second type of user equipments.

The user equipment 10 comprises a monitoring circuit 1401 configured to monitor a search space for control information of a PDCCH. As stated above, the search space is associated with the second type of user equipments and the PDCCH comprises at least one control channel element that comprises resource elements at least partly comprised in a second region of resource elements. The resource elements of the second region are only allowed to be scheduled for control information to user equipments of the second type. The at least one CCE is defined in relation to a CCE of a first region of resource elements, and the resource elements of the first region are allowed to be scheduled for control information to user equipments of a first type. The type of user equipments may be defined by characteristics of the user equipment, and in some embodiments the characteristics may indicate a capability or a release of the user equipment 10. Furthermore, the resource elements of the second region may in some embodiments be resource elements of an extended carrier and/or of an in-band region of a data part of a subframe.

In some embodiments the resource elements of the at least one control channel element may be fully comprised in the second region of resource elements. Alternatively, the resource elements of the first region are further allowed to be scheduled for control information to user equipments of the second type and the resource elements of the at least one control channel element are further partly comprised in the first region of resource elements. In some embodiments the at least one control channel element is offset Q in relation to a control channel element of the first type of user equipments. The offset Q is defined in control channel elements in the monitored search space. The offset Q in control channel elements may in some embodiments be aligned according to $Q = L \cdot q_L$ for all aggregation levels $L \in \{1,2,4,8\}$ where L is aggregation level and $q_L$ is a positive integer.

The user equipment 10 may in some embodiments be configured to obtain the monitored search space for the second type of user equipments of aggregation level $L \in \{1, 2, 4, 8\}$ as $$L\{(Y_k + m') \bmod \lfloor N_{CCE,k}^{(2)}/L \rfloor\} + i + Q$$

where L is aggregation level
i=0, ..., L−1,
$Y_k = (A Y_{k-1}) \bmod D$ where A=39827, D=65537, k=$\lfloor n_s/2 \rfloor$ where $n_s$ is the slot number within a radio frame and $Y_{-1}=n_{RNTI} \neq 0$ where $n_{RNTI}$ is the user equipment radio network temporary identifier;

and when the monitoring user equipment 10 is configured with a carrier indicator field value $m'=m+M^{(L)} \cdot n_{CI}$, where $n_{CI}$ is the carrier indicator field value;

else if the monitoring user equipment 10 is not configured with carrier indicator field value then $m'=m$, where $m=0, \ldots, M^{(L)}-1$, where m is the PDCCH candidate, $M^{(L)}$ is the number of PDCCH candidates to monitor in the given search space;

$N_{CCE,k}^{(2)}$ is the total number of control channel elements in the second control region of subframe k, and Q is the offset in control channel elements.

The monitoring circuit 1401 may further be configured to decode the PDCCH in the search space.

The user equipment 10 further comprises a detecting circuit 1402 configured to detect control information within the monitored search space.

Furthermore, the user equipment 10 comprises a communication circuit 1403 configured to use the detected control information for communicating with the radio network node 12.

In some embodiments the user equipment 10 further comprises a configuring circuit 1404 arranged to configure the monitoring circuit 1401 to perform the monitoring of the search space.

The embodiments herein for handling control information in a radio communications network may be implemented through one or more processors, such as a processing circuit 1405 in the user equipment 10 depicted in FIG. 14, together with computer program code for performing the functions and/or method steps of the embodiments herein. The program code mentioned above may also be provided as a computer program product, for instance in the form of a data carrier carrying computer program code for performing embodiments herein when being loaded into the user equipment 10. One such carrier may be in the form of a CD ROM disc. It is however feasible with other data carriers such as a memory stick. The computer program code may furthermore be provided as pure program code on a server and downloaded to the user equipment 10.

The user equipment may further comprise a memory 1406. The memory 1406 may comprise one or more memory units and may be used to store for example data such as search spaces, control information, application/s to perform the methods herein when being executed on the user equipment 10 or similar.

Figure 15:
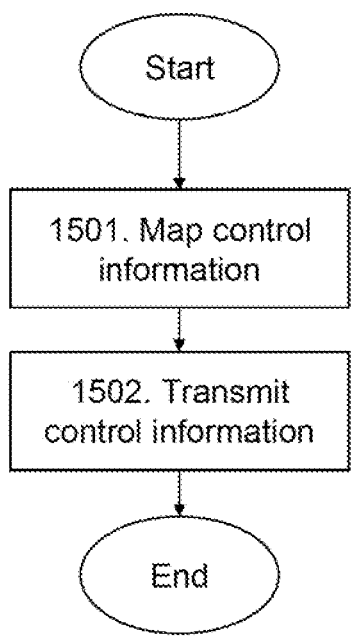
FIG. 15 is a flow chart of embodiments of a method in a radio network node.

The method steps in the radio network node 12 for handling scheduling of control information for a user equipment 10 in the radio communications network according to some embodiments will now be described with reference to a flowchart depicted in FIG. 15. The user equipment 10 is of a second type of user equipments and is served in a cell controlled by the radio network node 12. The radio network node 12 is comprised in the radio communications network.

Step 1501. The radio network node 12 maps control information for the user equipment 10 to a PDCCH, which PDCCH is associated with the second type of user equipments. The PDCCH comprises at least one control channel element that comprises resource elements at least partly comprised in a second region of resource elements, which resource elements of the second region are only allowed to be scheduled for control information to user equipments of the second type. The at least one CCE is defined in relation to a CCE of a first region of resource elements, and the resource elements of the first region are allowed to be scheduled for control information to user equipments of a first type. In some embodiments the type of user equipments is defined by characteristics of the user equipment 10 e.g. capability or a release of the user equipment.

In some embodiments resource elements of the at least one control channel element are fully comprised in the second region of resource elements. In some embodiments the resource elements of the first region are allowed to be scheduled for control information to user equipments of the second type and user equipments of a first type. In some embodiments the resource elements of the at least one control channel element are further at least partly comprised in the first region of resource elements. In some embodiments the at least one control channel element is offset Q in relation to a control channel element of the first type of user equipments. The offset is defined in control channel elements in the search space. The offset Q in control channel elements may in some embodiments be aligned according to $Q=L \cdot q_L$ for all aggregation levels $L \in \{1,2,4,8\}$. L is aggregation level and $q_L$ is a positive integer.

In some embodiments the at least one control channel element is overlapping a control channel element of a user equipment of the first type. Then the control channel element is being comprised in the first region, and which at least one control channel element is of a same or higher aggregation level than the control channel element of the user equipment of the first type. In some embodiments the PDCCH may comprise a set of control channel elements. In some embodiments the radio network node 12 performs the mapping by interleaving the PDCCH and then cyclically shifting the interleaved PDCCH.

Step 1502. The radio network node 12 transmits the control information over the PDDCH to the user equipment 10.

Figure 16:
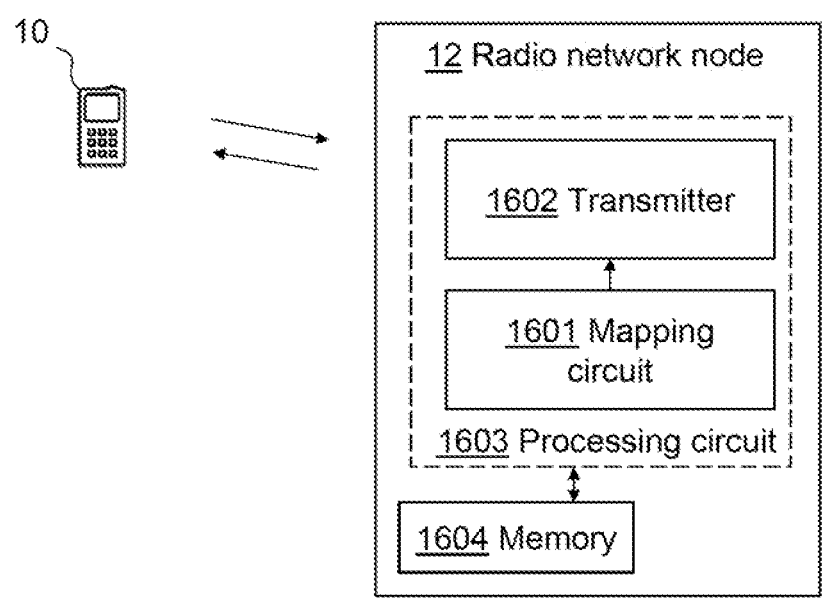
FIG. 16 is a block diagram depicting embodiments of a radio network node.

FIG. 16 is a block diagram depicting a radio network node 12, such as a radio base station, a relay node or similar, for handling scheduling of control information for a user equipment 10 in a radio communications network. The user equipment 10 is of a second type of user equipments and is served in a cell controlled by the radio network node 12.

The radio network node 12 comprises a mapping circuit 1601 configured to map 30 the control information for the user equipment 10 to a PDCCH, which PDCCH is associated with the second type of user equipments. The PDCCH comprises at least one control channel element that comprises resource elements at least partly comprised in a second region of resource elements. The resource elements of the second region are only allowed to be scheduled for control information to user equipments of the second type. The at least one CCE is defined in relation to a CCE of a first region of resource elements, and the resource elements of the first region are allowed to be scheduled for control information to user equipments of a first type. In some embodiments the resource elements of the at least one control channel element may be fully comprised in the second region of resource elements. In some embodiments the resource elements of the at least one control, channel element are further at least partly comprised in the first region of resource elements. In some embodiments the at least one control channel element is offset Q in relation to a control channel element of the first type of user equipments. The offset Q may be defined in control channel elements in the monitored search space. The offset Q in control channel elements may in some embodiments be aligned according to $Q = L \cdot q_L$ for all aggregation levels $L \in \{1,2,4,8\}$ where L is aggregation level and $q_L$ is a positive integer. In some embodiments the at least one control channel element is overlapping a control channel element of a user equipment of the first type, which control channel element is being comprised in the first region. The at least one control channel element is of a same or higher aggregation level than the control channel element of the user equipment of the first type. The PDCCH may comprise a set of control channel elements. The mapping circuit 1601 may in some embodiments be configured to interleave the PDCCH and then to cyclically shift the interleaved PDCCH to perform the mapping. In some embodiments the resource elements of the second region are resource elements of an extended carrier and/or of an in-band region of a data part of a subframe.

The radio network node 12 further comprises a transmitter 1602 configured to transmit the control information over the PDCCH to the user equipment 10.

The embodiments herein for handling scheduling of control information for the user equipment 10 in the radio communications network may be implemented through one or more processors, such as a processing circuit 1603 in the radio network node 12 depicted in FIG. 16, together with computer program code for performing the functions and/or method steps of the embodiments herein. The program code mentioned above may also be provided as a computer program product, for instance in the form of a data carrier carrying computer program code for performing embodiments herein when being loaded into the radio network node 12. One such carrier may be in the form of a CD ROM disc. It is however feasible with other data carriers such as a memory stick. The computer program code may furthermore be provided as pure program code on a server and downloaded to the radio network node 12.

The radio network node 12 may further comprise a memory 1604. The memory 1604 may comprise one or more memory units and may be used to store for example data such as search spaces, control information, scheduling data, DL data, application/s to perform the methods herein when being executed on the radio base station 12 or similar.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method in a user equipment for handling control information in a radio communications network, wherein the user equipment is served in a cell controlled by a radio network node configured to serve at least a first type of user equipment and a second type of user equipment, the first type of user equipment being a legacy type and the second type of user equipment being a non-legacy type, the user equipment being of the second type and the method comprising:

monitoring a first search space for control information of a physical data control channel (PDCCH), the first search space being at aggregation level $L \in \{1,2,4,8\}$ and being defined by a first equation:

$$L\{(Y_k + m') \bmod \lfloor N_{CCE,k}/L \rfloor\} + i,$$

where L is aggregation level,
i=0, ..., L−1,
$Y_k = (A Y_{k-1}) \bmod D,$ where A=39827, D=65537, $k = \lfloor n_s/2 \rfloor$, $n_s$ is a slot number within a radio frame,
$Y_{-1} = n_{RNTI} \neq 0$ and $n_{RNTI}$ is a user equipment radio network temporary identifier,
if the user equipment is configured with a carrier indicator field value, $m' = m + M^{(L)} \cdot n_{CI}$, where $n_{CI}$ is the carrier indicator field value, else if the user equipment is not configured with carrier indicator field value then m'=m, where m=0, ..., M(L)−1,
m is a PDCCH candidate, $M^{(L)}$ is a number of PDCCH candidates to monitor in the first search space; and
$N_{CCE,k}$ is a total number of control channel elements in the first region of subframe k,
monitoring a second search space for control information of an extended physical data control channel (EPDCCH), the second search space being associated with the second type of user equipment, the EPDCCH comprising at least one control channel element that comprises resource elements at least partly disposed in a second region of resource elements, the resource elements of the second region being only accessible to and allowed to be scheduled for control information to the second type of user equipment, and the resource elements of the first region being accessible to and allowed to be scheduled for control information to the first type of user equipment, the second search space being defined by a second equation different from the first equation,
detecting control information within the second search space, and
using the detected control information for communicating with the radio network node.

2. The method according to claim 1, wherein the resource elements of the at least one control channel element are fully comprised in the second region of resource elements.

3. The method according to claim 1, wherein the resource elements of the first region are further accessible to and allowed to be scheduled for control information to the second type of user equipment and the resource elements of the at least one control channel element are further partly comprised in the first region of resource elements.

4. The method according to claim 1, wherein the at least one control channel element is offset in relation to a control channel element of the first type of user equipment, the offset being defined in the control channel elements in the second search space.

5. The method according claim 4, wherein the offset in the control channel elements is aligned according to $Q = L \cdot q_L$ for all aggregation levels $L \in \{1,2,4,8\}$, where Q is the offset and $q_L$ is a positive integer.

6. The method according to claim 4, wherein the second search space is at aggregation level $L \in \{1,2,4,8\}$ and the second equation is:

$$L\{(Y_k + m') \bmod \lfloor N_{CCE,k}^{(2)}/L \rfloor\} + i + Q,$$

where $N_{CCE,k}^{(2)}$ is a total number of control channel elements in the second region of subframe k, and
Q is the offset in the control channel elements.

7. The method according to claim 1, wherein the monitoring further comprises decoding the EPDCCH in the second search space.

8. The method according to claim 1, wherein the type of user equipment is defined by characteristics of the user equipment.

9. The method according to claim 8, wherein the characteristics indicate a capability or a release of the user equipment.

10. The method according to claim 1, further comprising: configuring the user equipment to perform the monitoring of the first and second search spaces.

11. The method according to claim 1, where the resource elements of the second region are resource elements of an extended carrier and/or of an in-band region of a data part of a subframe.

12. A method in a radio network node for handling scheduling of first and second control information for a user equipment in a radio communications network, wherein the radio network node is configured to serve at least a first type of user equipment and a second type of user equipment, wherein the first type of user equipment is a legacy type and the second type of user equipment is a non-legacy type, the method comprising:

mapping the first control information for the user equipment to a physical data control channel (PDCCH) associated with a first search space at aggregation level $L\in\{1,2,4,8\}$ and defined by a first equation:

$$L\{(Y_k+m')\bmod\lfloor N_{CCE,k}/L\rfloor\}+i,$$

where L is aggregation level,
i=0, . . . , L−1,
$Y_k=(AY_{k-1})\bmod D$,
where A=39827, D=65537, $k=\lfloor n_s/2\rfloor$, $n_s$ is a slot number within a radio frame,
$Y_{-1}=n_{RNTI}\neq 0$ and $n_{RNTI}$ is a user equipment radio network temporary identifier,
if the user equipment is configured with a carrier indicator field value, $m'=m+M^{(L)}\cdot n_{CI}$, where $n_{CI}$ is the carrier indicator field value, else if the user equipment is not configured with carrier indicator field value then m'=m, where m=0, . . . , M(L)−1,
m is a PDCCH candidate, $M^{(L)}$ is a number of PDCCH candidates to monitor in the first search space; and
$N_{CCE,k}$ is a total number of control channel elements in the first region of subframe k, mapping the second control information for the user equipment to an extended physical data control channel (EPDCCH), the EPDCCH being associated with the second type of user equipment and the EPDCCH comprising at least one control channel element that comprises resource elements at least partly comprised in a second region of resource elements, the resource elements of the second region being only accessible to and allowed to be scheduled for control information to the second type of user equipment, and the resource elements of the first region being accessible to and allowed to be scheduled for control information to the first type of user equipment, the EPDCCH being associated with a second search space defined by a second equation different from the first equation, and
transmitting the second control information over the EPDCCH to the user equipment.

13. The method according to claim 12, wherein the resource elements of the at least one control channel element are fully comprised in the second region of resource elements.

14. The method according to claim 12, wherein the resource elements of the at least one control channel element are further at least partly comprised in the first region of resource elements.

15. The method according to claim 14, wherein the at least one control channel element is offset in relation to a control channel element of the first type of user equipment, the offset being defined in control channel elements in a monitored search space.

16. The method according claim 15, wherein the offset in the control channel elements is aligned according to $Q=L\cdot q_L$ for all aggregation levels $L\in\{1,2,4,8\}$, where L is aggregation level, Q is the offset and $q_L$ is a positive integer.

17. The method according to claim 14, wherein the at least one control channel element is overlapping a control channel element of the first type of user equipment, the control channel element being comprised in the first region, and the at least one control channel element being of a same or higher aggregation level than the control channel element of the first type of user equipment.

18. The method according to claim 12, wherein the PDCCH comprises a set of control channel elements.

19. The method according to claim 12, further comprising interleaving the EPDCCH and then cyclically shifting the interleaved EPDCCH to perform the mapping.

20. The method according to claim 12, wherein the resource elements of the second region are resource elements of an extended carrier and/or of an in-band region of a data part of a subframe.

21. A user equipment for handling control information in a radio communications network, wherein the user equipment is configured to be served in a cell controlled by a radio network node configured to serve at least a first type of user equipment and a second type of user equipment, the first type of user equipment being a legacy type and the second type of user equipment being a non-legacy type, the user equipment being of the second type and comprising:

a first monitoring circuit configured to monitor a first search space for control information of a physical data control channel (PDCCH), the first search space being at aggregation level $L\in\{1,2,4,8\}$ and being defined by a first equation:

$$L\{(Y_k+m')\bmod\lfloor N_{CCE,k}/L\rfloor\}+i,$$

where L is aggregation level,
i=0, . . . , L−1,
$Y_k=(AY_{k-1})\bmod D$,
where A=39827, D=65537, $k=\lfloor n_s/2\rfloor$, $n_s$ is a slot number within a radio frame,
$Y_{-1}=n_{RNTI}\neq 0$ and $n_{RNTI}$ is a user equipment radio network temporary identifier,
if the user equipment is configured with a carrier indicator field value, $m'=m+M^{(L)}\cdot n_{CI}$, where $n_{CI}$ is the carrier indicator field value, else if the user equipment is not configured with carrier indicator field value then m'=m, where m=0, . . . , M(L)−1,
m is a PDCCH candidate, $M^{(L)}$ is a number of PDCCH candidates to monitor in the first search space; and
$N_{CCE,k}$ is a total number of control channel elements in the first region of subframe k, a second monitoring circuit configured to monitor a second search space for control information of an extended physical data control channel (EPDCCH), the second search space being associated with the second type of user equipment, the EPDCCH comprising at least one control channel element that comprises resource elements at least partly comprised in a second region of resource elements, the resource elements of the second region being only accessible to and allowed to be scheduled for control information to the second type of user equipment, and the resource elements of the first region being accessible to and allowed to be scheduled for control information to the first type of user equipment, the second search space being defined by a second equation different from the first equation, a detecting circuit configured to detect the control information within the second search space, and a communication circuit configured to use the detected control information for communicating with the radio network node.

22. The user equipment according to claim 21, wherein the resource elements of the at least one control channel element are fully comprised in the second region of resource elements.

23. The user equipment according to claim 21, wherein the resource elements of the first region are further accessible to and allowed to be scheduled for control information to the second type of user equipment and the resource elements of the at least one control channel element are further partly comprised in the first region of resource elements.

24. The user equipment according to claim 21, wherein the at least one control channel element is offset in relation to a control channel element of the first type of equipment, the offset being defined in the control channel elements in the second search space.

25. The user equipment according claim 24, wherein the offset in the control channel elements is aligned according to $Q = L \cdot q_L$ for all aggregation levels $L \in \{1,2,4,8\}$, where L is aggregation level, Q is the offset and $q_L$ is a positive integer.

26. The user equipment according to claim 24, wherein the second search space is at aggregation level $L \in \{1,2,4,8\}$ and the second equation is:

$$L\{(Y_k + m') \bmod [N_{CCE,k}^{(2)}/L]\} + i + Q$$

$N_{CCE,k}^{(2)}$ is a total number of control channel elements in the second region of subframe k, and Q is the offset in the control channel elements.

27. The user equipment according to claim 21, wherein the second monitoring circuit is further configured to decode the EPDCCH in the second search space.

28. The user equipment according to claim 21, wherein the type of user equipment is defined by characteristics of the user equipment.

29. The user equipment according to claim 28, wherein the characteristics indicate a capability or a release of the user equipment.

30. The user equipment according to claim 21, further comprising a configuring circuit arranged to configure the first and second monitoring circuits to perform the monitoring of the first and second search spaces.

31. The user equipment according to claim 21, where the resource elements of the second region are resource elements of an extended carrier and/or of an in-band region of a data part of a subframe.

32. A radio network node for handling scheduling of first and second control information for a user equipment in a radio communications network, wherein the radio network node is configured to serve at least a first type of user equipment and a second type of user equipment, wherein the first type of user equipment is a legacy type and the second type of user equipment is a non-legacy type, the radio network node comprising:

a first mapping circuit configured to map the first control information for the user equipment to a physical data control channel (PDCCH) associated with a first search space at aggregation level $L \in \{1,2,4,8\}$ and defined by a first equation:

$$L\{(Y_k + m') \bmod [N_{CCE,k}/L]\} + i,$$

where L is aggregation level,
$i = 0, \ldots, L-1$, $Y_k = (A Y_{k-1}) \bmod D$, where $A = 39827$, $D = 65537$, $k = \lfloor n_s/2 \rfloor$, $n_s$ is a slot number within a radio frame, $Y_{-1} = n_{RNTI} \neq 0$ and $n_{RNTI}$ is a user equipment radio network temporary identifier, if the user equipment is configured with a carrier indicator field value, $m' = m + M^{(L)} \cdot n_{CI}$, where $n_{CI}$ is the carrier indicator field value, else if the user equipment is not configured with carrier indicator field value then $m' = m$, where $m = 0, \ldots, M(L) - 1$, m is a PDCCH candidate, $M^{(L)}$ is a number of PDCCH candidates to monitor in the first search space; and $N_{CCE,k}$ is a total number of control channel elements in the first region of subframe k, a second mapping circuit configured to map the second control information for the user equipment to an extended physical data control channel (EPDCCH), the EPDCCH being associated with the second type of user equipment and the EPDCCH comprising at least one control channel element that comprises resource elements at least partly comprised in a second region of resource elements, the resource elements of the second region being only accessible to and allowed to be scheduled for control information to the second type of user equipment, and the resource elements of the first region being accessible to and allowed to be scheduled for control information to the first type of user equipment, the EPDCCH being associated with a second search space defined by a second equation different from the first equation, and a transmitter configured to transmit the second control information over the EPDCCH to the user equipment.

33. The radio network node according to claim 32, wherein the resource elements of the at least one control channel element are fully comprised in the second region of resource elements.

34. The radio network node according to claim 32, wherein the resource elements of the at least one control channel element are further at least partly comprised in the first region of resource elements.

35. The radio network node according to claim 34, wherein the at least one control channel element is overlapping a control channel element of the first type of user equipment, the control channel element being comprised in the first region, and the at least one control channel element being of a same or higher aggregation level than the control channel element of the first type of user equipment.

36. The radio network node according to claim 32, wherein the at least one control channel element is offset in relation to a control channel element of the first type of equipment, the offset being defined in control channel elements in a monitored search space.

37. The radio network node according claim 36, wherein the offset in the control channel elements is aligned according to $Q = L \cdot q_L$ for all aggregation levels $L \in \{1,2,4,8\}$, where L is aggregation level, Q is the offset and $q_L$ is a positive integer.

38. The radio network node according to claim 32, wherein the PDCCH comprises a set of control channel elements.

39. The radio network node according to claim 32, wherein the mapping circuit is configured to interleave the EPDCCH and then to cyclically shift the interleaved EPDCCH to perform the mapping.

40. The radio network node according to claim 32, wherein the resource elements of the second region are resource elements of an extended carrier and/or of an in-band region of a data part of a subframe.

* * * * *

UNITED STATES PATENT AND TRADEMARK OFFICE
CERTIFICATE OF CORRECTION

PATENT NO. : 9,503,239 B2
APPLICATION NO. : 13/207790
DATED : November 22, 2016
INVENTOR(S) : Larsson et al.

Page 1 of 1

It is certified that error appears in the above-identified patent and that said Letters Patent is hereby corrected as shown below:

In the Specification

In Column 12. Line 40. delete "$N_{ext=}4*floor$" and insert -- $N_{ext}=4*floor$ --.

Signed and Sealed this
Thirtieth Day of October, 2018

Andrei Iancu
*Director of the United States Patent and Trademark Office*